B. GARROS.
DEVICE FOR AUTOMATICALLY CONTROLLING MOVING PICTURE MACHINES.
APPLICATION FILED OCT. 26, 1914.
1,138,744.
Patented May 11, 1915.
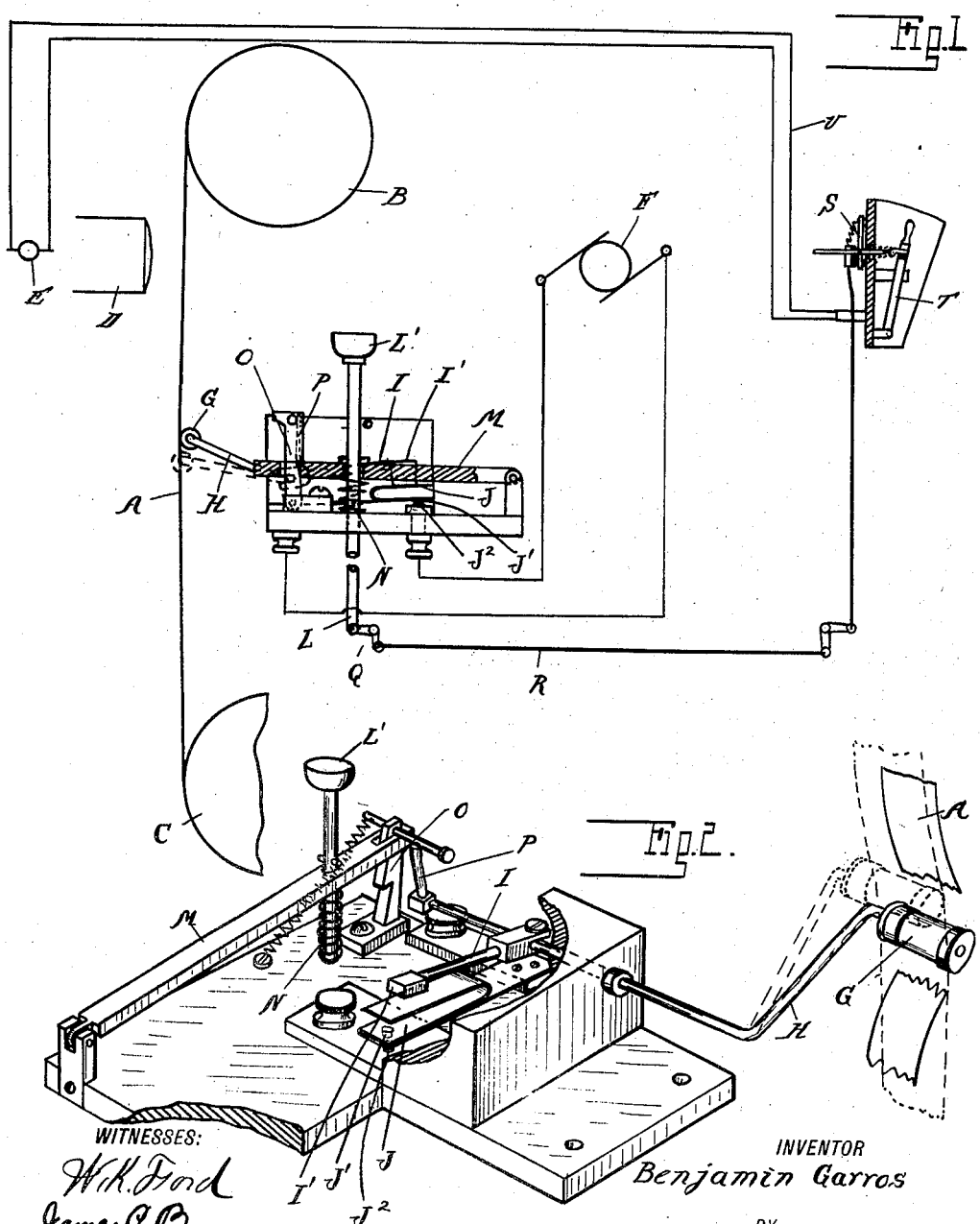
WITNESSES:
W. K. Ford
James P. Barry
INVENTOR
Benjamin Garros
BY
Whittemore, Hulbert & Whittemore
ATTORNEYS

UNITED STATES PATENT OFFICE.

BENJAMIN GARROS, OF DETROIT, MICHIGAN, ASSIGNOR OF TWENTY-FIVE ONE-HUNDREDTHS TO CHARLES E. ALLINGER, TWENTY-FIVE ONE-HUNDREDTHS TO CHARLES A. STRELINGER, TWENTY-FIVE ONE-HUNDREDTHS TO CHARLES T. BUSH, AND TWENTY-FIVE ONE-HUNDREDTHS TO MAJOR E. JONES, ALL OF DETROIT, MICHIGAN.

DEVICE FOR AUTOMATICALLY CONTROLLING MOVING-PICTURE MACHINES.

1,138,744.  Specification of Letters Patent.  Patented May 11, 1915.

Application filed October 26, 1914. Serial No. 868,682.

*To all whom it may concern:*

Be it known that I, BENJAMIN GARROS, a citizen of the United States of America, residing at Detroit, in the county of Wayne and State of Michigan, have invented certain new and useful Improvements in Devices for Automatically Controlling Moving-Picture Machines, of which the following is a specification, reference being had therein to the accompanying drawings.

The invention relates to controlling devices for moving picture machines and it is the object of the invention to provide means for guarding against the destruction of the film in case of breakage.

In the present state of the art films of moving picture machines travel at a relatively high velocity and when they break, which frequently occurs, a considerable portion will be mutilated before the mechanism can be stopped. This is particularly the case where the operator is in control of two machines, as a break may occur in the film of one machine while he is giving attention to the other machine, and delay in stopping the motor is thereby unavoidable. Furthermore, when a film breaks a portion will be exposed to the concentrated light, and the heat is sufficient to ignite the inflammable material.

With my improved construction the difficulties above referred to are avoided, first, by the provision of automatic means for stopping the motor which drives the film the instant the latter breaks; and second, by also providing means for turning off the light on the breakage of the film, thereby avoiding ignition.

In the drawings: Figure 1 is a diagram showing my improvement applied to a moving picture machine; and Fig. 2 is a perspective view of the control mechanism.

As diagrammatically represented in Fig. 1, A is the traveling film which moves from the reel B to the reel C. D is the lens or projector and E is the electric light. F represents the electric motor for driving the mechanism, the mechanical driving connections not being shown.

My improved control mechanism comprises automatically-operating means for stopping the motor and for turning off the light, said means being normally restrained from action by the film when in unbroken and operative condition. The arrangement is, however, such that upon the breaking of the film the restraining influence ceases, whereupon the mechanism automatically operates to stop the motor and turn off the light.

As specifically shown, G is an idler pulley which bears against a portion of the film intermediate the reels B and C.

H is a rock-arm on which the idler G is journaled, and I is a connected rock-arm which operates to close an electric switch J. In the normal position of the parts where the film is in action, the arm I is held in a position where the insulator block I' thereon holds the spring contact member J' against the coöperating contact $J^2$, thereby closing the electric circuit K for the motor F. When, however, the film breaks the rock-arm H is permitted to drop downward into the position shown in dotted lines, which lifts the rock-arm I and permits the spring contacts of the switch J to separate. This breaks the motor circuit and stops the mechanism.

In addition to the mechanism for stopping the motor the idler G and rock-arm H also control an electric switch for the light. As shown L is a rod having an operating handle or thumb piece L', said rod being connected to a lever M actuated in one direction by a spring N sleeved upon the rod.

O is a latch for engaging the lever M when depressed by the rod L against the tension of the spring N, and P is a rock-arm connected with the rock-arm H for tripping the latch O and releasing the lever M. The rod L is connected by a suitable linkage, such as indicated by the rods Q R, etc., to a latch S for holding closed a self-opening electric switch T. This switch, which may be of any suitable construction, controls the circuit U of the lamp E, and the arrangement is such that when the latch O is tripped the spring N, actuating the rod L and the linkage between the same and the latch S, will withdraw the latter and permit the switch T to open.

In the operation of the machine, when the film is placed in position the idler pulley G is pressed back so as to hold the arm H and connected arms I and P in the position shown in full lines in Fig. 1. This will close the electric switch J, and the operator by depressing the rod L through the thumb-piece L' will engage the lever M with the latch O, compressing the spring N. This will move the latch S into a position where it will engage the switch T when the latter is closed. During the normal operation of the machine the parts will remain in the position just described, but if at any time a break occurs in the film, the dropping of the pulley G and arm H simultaneously actuates the arms I and P. The former withdraws from the switch J and permits the same to automatically open, while the latter by tripping the latch O permits the spring N to actuate the rod L and disengage the latch S, so that the switch T automatically opens as previously described.

What I claim as my invention is:—

1. The combination with a traveling film, an electric motor for operating the same and a switch controlling said motor, of an idler pulley bearing against said film in its normally operative position, a rock-arm on which said idler pulley is mounted, and mechanism mechanically connected to said rock-arm for operating said electric switch when said pulley is released by the discontinuance of the film.

2. The combination with a traveling film, a motor for actuating the same and a source of light, of a controlling mechanism comprising an idler pulley bearing against said film in its normally operative position, a rock-arm on which said pulley is journaled, a second rock-arm connected to said first-mentioned rock-arm for closing the motor switch in the normal position of parts, mechanism for automatically opening the electric switch for the light, a latch for restraining said mechanism from operation, and a trip actuated by said first-mentioned rock-arm upon the discontinuance of the film and release of the pulley for releasing said latch.

3. The combination with a traveling film and a motor for actuating the same, of a light adjacent to said film, a rock-arm restrained by said film when in normal operative position, a means connected to said rock-arm for controlling said motor, and a separate means connected to said rock-arm for controlling said light, each of said controlling means automatically operating upon the release of said rock-arm by the discontinuance of the film to respectively stop the motor and light.

4. The combination with a traveling film and a motor for actuating the same, of a controlling mechanism comprising an idler pulley bearing against said film in its normally operative position, a rock-arm on which said pulley is journaled, and a second rock-arm upon said first-mentioned rock-arm for closing the motor switch in the normal position of parts, said second rock-arm permitting the motor switch to open upon the discontinuance of the film.

5. The combination with a traveling film, of a motor for actuating the same, an arm restrained by said film when in normally operative position, a switch, and a member on said arm for normally maintaining said switch closed, said arm automatically operating said member upon the discontinuance of said film to open said switch.

In testimony whereof I affix my signature in presence of two witnesses.

BENJAMIN GARROS.

Witnesses:
JAMES P. BARRY,
HENRI E. BOWMAN.